US012753693B2

(12) United States Patent
Rennkamp

(10) Patent No.: US 12,753,693 B2
(45) Date of Patent: Oct. 6, 2026

(54) DEVICE FOR EMPTYING CONVEYING BUCKETS DURING THE SINKING OF SHAFTS

(71) Applicant: HERRENKNECHT AG, Schwanau (DE)

(72) Inventor: Patrick Rennkamp, Lahr (DE)

(73) Assignee: Herrenknecht AG, Schwanau (DE)

(*) Notice: Subject to any disclaimer, the term of this patent is extended or adjusted under 35 U.S.C. 154(b) by 0 days.

(21) Appl. No.: 18/854,243

(22) PCT Filed: Apr. 11, 2023

(86) PCT No.: PCT/EP2023/059465
§ 371 (c)(1),
(2) Date: Oct. 4, 2024

(87) PCT Pub. No.: WO2023/194627
PCT Pub. Date: Oct. 12, 2023

(65) Prior Publication Data
US 2026/0002444 A1 Jan. 1, 2026

(30) Foreign Application Priority Data
Apr. 8, 2022 (DE) ..................... 10 2022 108 661.5

(51) Int. Cl.
*E21D 1/03* (2006.01)
*B65G 11/18* (2006.01)
(Continued)

(52) U.S. Cl.
CPC .............. *E21D 1/03* (2013.01); *B65G 11/186* (2013.01); *B65G 11/206* (2013.01); *B65G 65/23* (2013.01); *B65G 2201/045* (2013.01)

(58) Field of Classification Search
CPC ........ B65G 65/23; B65G 65/34; B65G 65/36; B65G 11/00; B65G 11/12; B65G 11/123;
(Continued)

(56) References Cited

U.S. PATENT DOCUMENTS 677,560 A * 7/1901 Collier .................. B65G 65/23 414/653
1,254,997 A * 1/1918 Eaton ........................ E21D 1/03 414/609
(Continued)

FOREIGN PATENT DOCUMENTS

DE 1081396 B 5/1960
DE 1922609 A1 11/1970
GB 830231 A 3/1960

*Primary Examiner* — Glenn F Myers
(74) *Attorney, Agent, or Firm* — Mark Rodgers

(57) ABSTRACT

The invention relates to a device for emptying a conveying bucket of rock/soil loosened during the sinking of a shaft with a chute (20) for the rock/soil (400) emptied from the conveying bucket (200, 200'), which can be moved linearly between a conveying bucket transport position and a conveying bucket emptying position by means of an actuator. A receiving element (30) for the conveying bucket (200, 200') is provided for establishing a retaining connection between the chute (20) and the conveying bucket (200, 200'), which is arranged on the chute (20) so as to be rotatable about an axis of rotation (33), the receiving element (30) being pivotable between a receiving position (420) and an emptying position (430) by means of an actuator (34).

8 Claims, 8 Drawing Sheets

Figure 1:
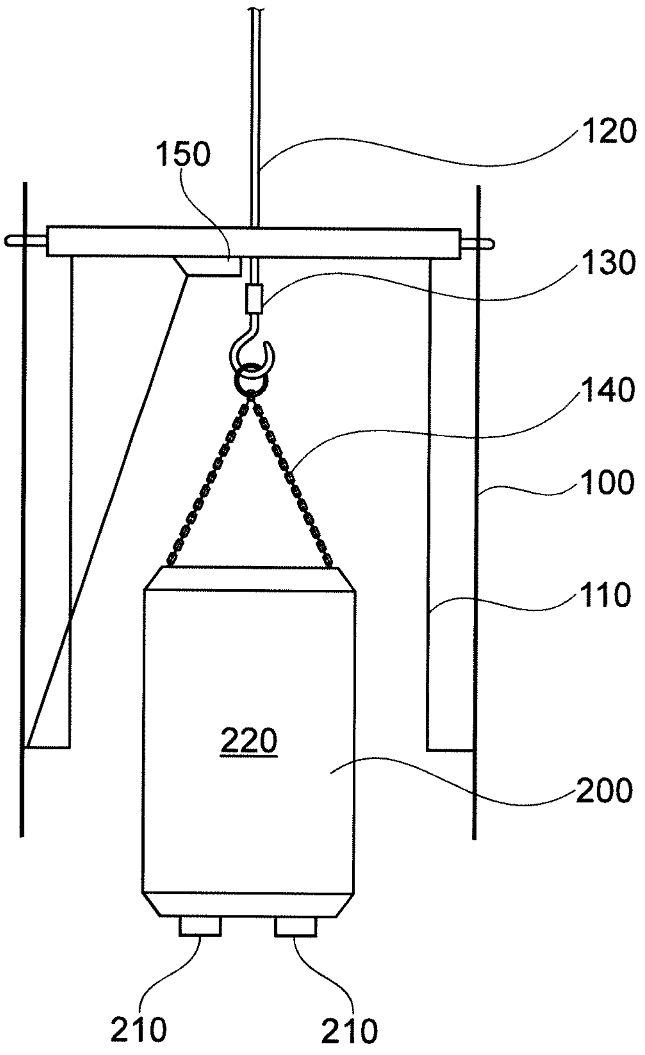

(51) Int. Cl.
*B65G 11/20* (2006.01)
*B65G 65/23* (2006.01)

(58) Field of Classification Search
CPC ..... B65G 11/126; B65G 11/14; B65G 11/166; B65G 11/186; B65G 11/206; B65G 2201/045; B65G 2201/04; B65G 17/126; E21D 1/03
See application file for complete search history.

(56) References Cited

U.S. PATENT DOCUMENTS

| | | | | |
|---|---|---|---|---|
| 1,318,472 | A * | 10/1919 | Arnot | B65G 11/126<br>414/609 |
| 1,524,334 | A * | 1/1925 | Brown | B65G 11/126<br>198/538 |
| 4,458,800 | A * | 7/1984 | Christenson | B28C 5/4251<br>74/105 |
| 4,951,260 | A * | 8/1990 | Strehlow | B01F 35/451<br>366/187 |
| 2016/0223062 | A1 * | 8/2016 | Pate | F16H 55/17 |

* cited by examiner

DEVICE FOR EMPTYING CONVEYING BUCKETS DURING THE SINKING OF SHAFTS

The invention relates to a device for emptying a conveying bucket of rock/soil loosened during the sinking of a shaft with a chute for the rock/soil/material emptied from the conveying bucket, which is moveable linearly between a conveying bucket transport position and a conveying bucket emptying position by means of an actuator.

When sinking a shaft in the ground, it is necessary to remove the loosened rock/soil from the bottom of the shaft. For this purpose, open-top conveying buckets (also known as kibble) are used as hoisting vessels, which are moved up and down the shaft by means of a cable winch. For example, conveying buckets with a hoisting volume of 7 $m^3$ and a total filled weight of approx. 20 tons are used.

It is advantageous to use a double drum winch (Blair winch/double drum Blair winch) to move the conveying buckets up and down the shaft in opposite directions, which balances the weight of the ropes and conveying buckets and thus saves drive power.

A double drum winch is provided on the surface above ground, which has a drive that drives a first drum shaft. A first drum is arranged on the drum shaft, on which a first conveyor rope can be wound/unwound, for example from below in a first winding/unwinding direction. The drum shaft is connected to a second drum shaft, possibly via a coupling, so that the first drum shaft is rotated by the drive together with the second drum shaft. A second drum is arranged on the drum shaft, on which a second conveyor rope can be unwound/rewound, for example from above and below in a second unwinding/rewinding direction. The drum directions are in opposite directions, so that one conveyor rope is reeled up and the other conveyor rope is simultaneously unreeled and vice versa, while both drums and both drum shafts are rotated in the same direction by the drive. In their respective temporary end positions, one conveying bucket is located at the bottom of the shaft in order to be filled, which is represented here by a bunker in the filling location, while the other conveying bucket is located at the top, for example above ground, in order to be emptied in the area of the so-called pit bank, represented here by a chute, via which the loosened rock/soil (material) in the conveying bucket is conveyed away.

In mining, the term “pit bank” refers to the devices and installations in the hoisting building above ground/in the shaft that are used to empty the conveying buckets.

From the state of the art, the skilled person is generally aware from his specialist knowledge that guide ropes are tensioned in the shaft as a shaft guide, on which, for example, a guide carriage moves up and down safely guided in the shaft. The guide carriage is detachably connected to a hoisting cable, for example via a detachable locking mechanism. The guide carriage is moved up and down the shaft together with the conveying bucket via the hoisting cable. A hook is arranged on the conveyor cable, to which the bucket is attached, for example via a chain hanger. Alternatively, a swivel-mounted support bracket can be used on the bucket. The conveying bucket is suspended movably/pivotably by the chain hanger. To empty, the conveying bucket is moved to an area above the pig bank. Then, for example, a chain (not shown), referred to here as a tipping chain, is detachably attached to a connecting element in the form of an eyelet. The conveying bucket is then moved downwards by lowering the conveyor cable and rotated by the tilting chain around a horizontal axis (not shown here), i.e. tilted when the chain is taut. The further the conveyor rope is lowered, the more the bucket is tilted until the loosened soil/rock falls out of the bucket by gravity into a chute. Once the bucket is completely empty, the conveyor rope is lifted again and the bucket is returned to a vertical position. The tilting chain is then released from the connecting element and the bucket can be lowered back into the shaft.

A similar procedure is known from DE19701105A. Here, a bucket is loosely guided by guide ropes or slats inside the shaft. A tilting device is arranged above the shaft, which essentially consists of a frame carrying a connecting chute and a channel-shaped chute. While the connecting chute is fixed on the frame, the channel-shaped chute can be swiveled around a joint in such a way that it is swiveled into the conveying path of the bucket on the one hand and swiveled out of the conveying path of the bucket on the other. Pivoting is carried out with the aid of a working cylinder. In the tilted position, the material in the bucket is emptied into the channel-shaped chute and via the connecting chute into a conveyor carriage. The bucket is tilted by a hook, which is arranged in the area of the longitudinal center plane of the chute above its inner bottom surface and in the area of its length section that can be swiveled into the conveying path of the bucket, engaging in an annular groove of the bucket, which is open towards the center of the bucket bottom. By lowering the conveyor rope, the bucket is pivoted around the pivot point formed by the hook until the material can flow into the chute. The bucket is then swiveled back by lifting the conveyor rope and the chute is swiveled out of the conveyor path.

Filling the conveying bucket on the sinking device in the shaft, for example, takes approx. 30 seconds. Emptying the bucket in the winding tower takes considerably longer, for example approx. 90 to 180 seconds.

Another difficulty is that the hoisting rope has to be moved to empty the conveying bucket in the hoisting tower, which also moves the bucket in the shaft due to the construction of the double winch. This means that the conveying bucket at the bottom cannot be filled during emptying or that emptying at the top and filling at the bottom must be carried out separately.

The task of the invention is to improve the emptying of the conveying buckets in the hoisting tower so that the emptying time is reduced and the hoisting rope does not have to be moved.

According to the invention, the problem is solved in accordance with claim 1. Further detailed solutions are defined by the subclaims.

This significantly reduces bucket circulation times and makes operation much more automatic and reliable.

In particular, the solution according to the invention provides for a receiving element for the conveying bucket for establishing a retaining connection between the chute and the conveying bucket, which is arranged on the chute so as to be rotatable about an axis of rotation, the receiving element being pivotable between a receiving position and an emptying position by means of an actuator.

Tilting the conveying bucket without moving the conveyor rope is achieved here in a simple way, so that the lower conveying bucket can be filled while the upper conveying bucket is emptied. Furthermore, it is easy to automate the emptying of the bucket in this way, especially in unmanned operation.

A further teaching of the invention provides that the receiving element has a rotation section and engagement section, with a connecting section of the conveying bucket, preferably in the form of at least one projection element, for example in the form of a fork element or mold element. It has been shown that this can provide a quickly detachable but secure connection.

A further teaching of the invention provides for the rotation section to be pivotable by means of an actuator, preferably a hydraulic cylinder. This enables a simple, quick and safe A further teaching of the invention provides that the chute is constructed in at least two parts, one part, for example the upper chute part, being relatively movable with respect to the other part, for example the chute base. It is advantageous that the relative movement can be effected by means of an actuator, preferably a hydraulic cylinder, and it has been shown that this enables the chute to be moved easily and safely into and out of the conveying path of the conveying bucket.

A further teaching of the invention provides that the conveying rope of the conveying bucket is essentially not deflectable when the receiving element is pivoted.

A further teaching of the invention provides that the conveying bucket can be pivoted by more than 90 degrees.

A further teaching of the invention provides for the conveying bucket to be pivotable until it is parallel to the bottom of the chute.

A further teaching of the invention provides that a rotating device is provided with which the chute and/or the receiving element can be pivoted horizontally between two receiving positions or emptying positions. This makes it possible in a simple way to empty two separate conveying buckets one after the other with a device according to the invention.

In the following, the invention will be explained in more detail with the aid of a drawing of a preferred embodiment. It shows FIG. 1 a conveying bucket with guide carriage in side view with a connecting element for the device according to the invention, FIG. 2 a schematic representation of a double drum conveyor system with two conveying buckets and a filling location in the area of a temporary shaft bottom and an emptying location above ground with a device according to the invention, FIG. 3 a spatial representation of a device according to the invention, FIG. 4 a side view of the device according to the invention with freely suspended conveying bucket, FIG. 5 the device according to the invention in side view with connected conveying bucket, FIG. 6 the device according to the invention in side view with tilted conveying bucket, FIG. 7 a side view of the device according to the invention with the conveying bucket tilted further, and FIG. 8 a pivotable embodiment of the device according to the invention with conveying buckets.

FIG. 1 shows a conveying bucket 200 for use with a device 10 according to the invention for emptying a conveying bucket when sinking a shaft. Guide ropes 100 are tensioned in the shaft (not shown) as a shaft guide, on which, for example, a guide carriage 110 travels up and down the shaft in a safely guided manner. Other shaft guides such as rails or the like are also possible.

The guide carriage 110 is detachably connected to a conveyor cable 120, for example via a detachable locking mechanism 150.

The guide carriage 110 is moved up and down the shaft together with the conveying bucket 200 via the hoisting cable 120.

A hook 130 is arranged on the conveyor cable 120, on which the conveying bucket 200 is suspended, for example via a chain hanger 140. Alternatively, a support bracket pivotably mounted on the conveying bucket 200 can also be used. The conveying bucket 200, 200' is suspended movably/pivotably by the chain hanger 140. It has a connecting element 210 on its underside, into which a receiving element 30 can engage.

Figure 2:
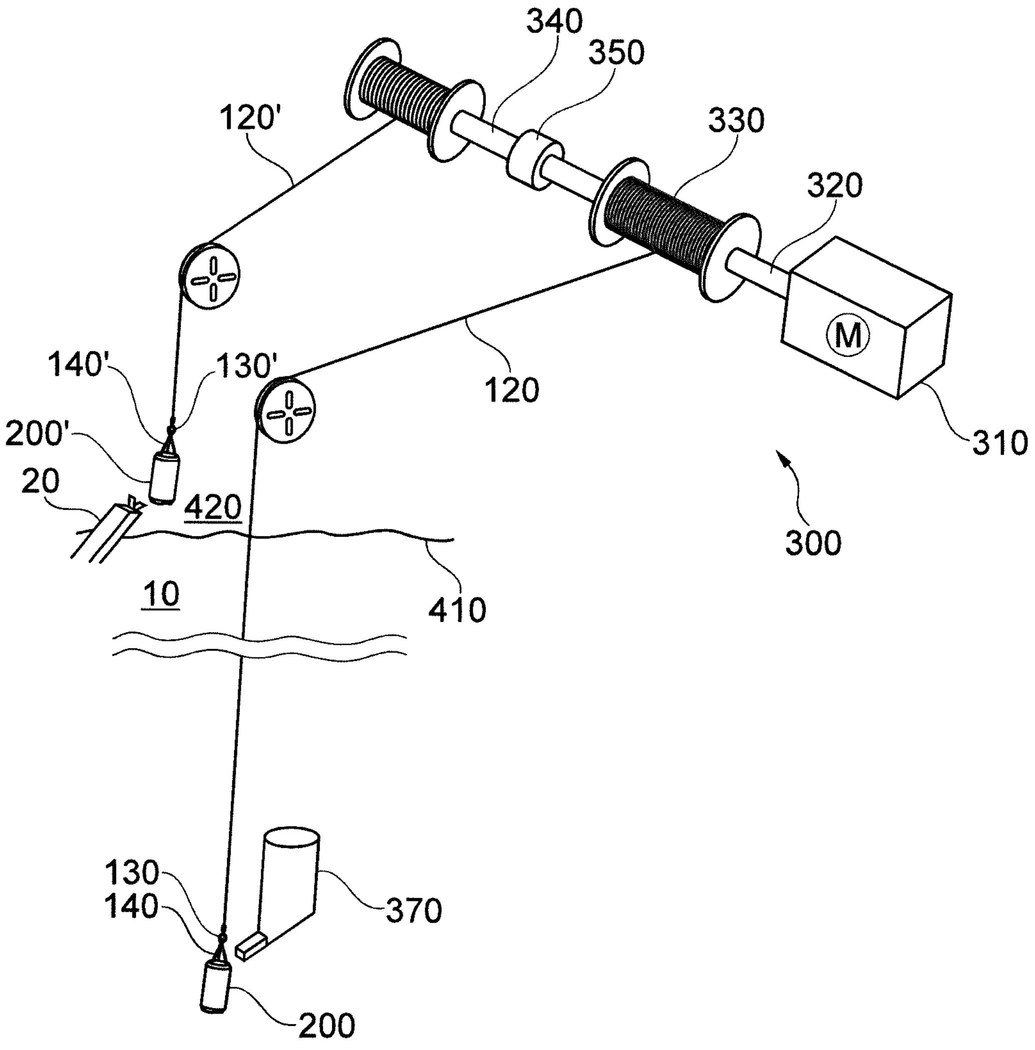

FIG. 2 shows a conveyor system 500 with a double drum winch 300 with the device 10 according to the invention for emptying a conveying bucket 200, 200' during the sinking of a shaft. The double drum winch 300 shown here schematically, for example at the surface 410, has a drive 310 which drives a first drum shaft 320. A first drum 330 is arranged on the drum shaft 320, on which a first winding cable 120 can be wound/unwound, for example from below in a first winding/unwinding direction. The drum shaft 320 is connected to a second drum shaft 340, possibly via a coupling 350, so that the first drum shaft 320 is rotated together with the second drum shaft 340 by the drive 310. A second drum 360 is arranged on the drum shaft 340, on which a second conveyor cable 120' can be unwound/rewound, for example from above below in a second unwinding/rewinding direction. The drum directions are in opposite directions, so that one conveyor cable 120, 120' is reeled up and the other conveyor cable 120', 120 is simultaneously unreeled and vice versa, while both drums 330, 360 and both drum shafts 320, 340 are rotated in the same direction by the drive 310.

In their respective temporary end positions, one conveying bucket 200 is located at the bottom of the shaft in order to be filled, which is represented here by a bunker 370 in the filling location, while the other conveying bucket 200' is located at the top, for example above ground, in order to be emptied in the area of the so-called suspended bench, represented here by a chute 20 of the device 10 according to the invention, onto which the loosened rock/soil 400 located in the conveying bucket 200, 200' is emptied and subsequently conveyed away.

In mining, the term "pit bank" refers to the devices and installations in the hoisting building above ground/in the shaft that are used to empty the 200, 200' conveying buckets.

Figure 3:
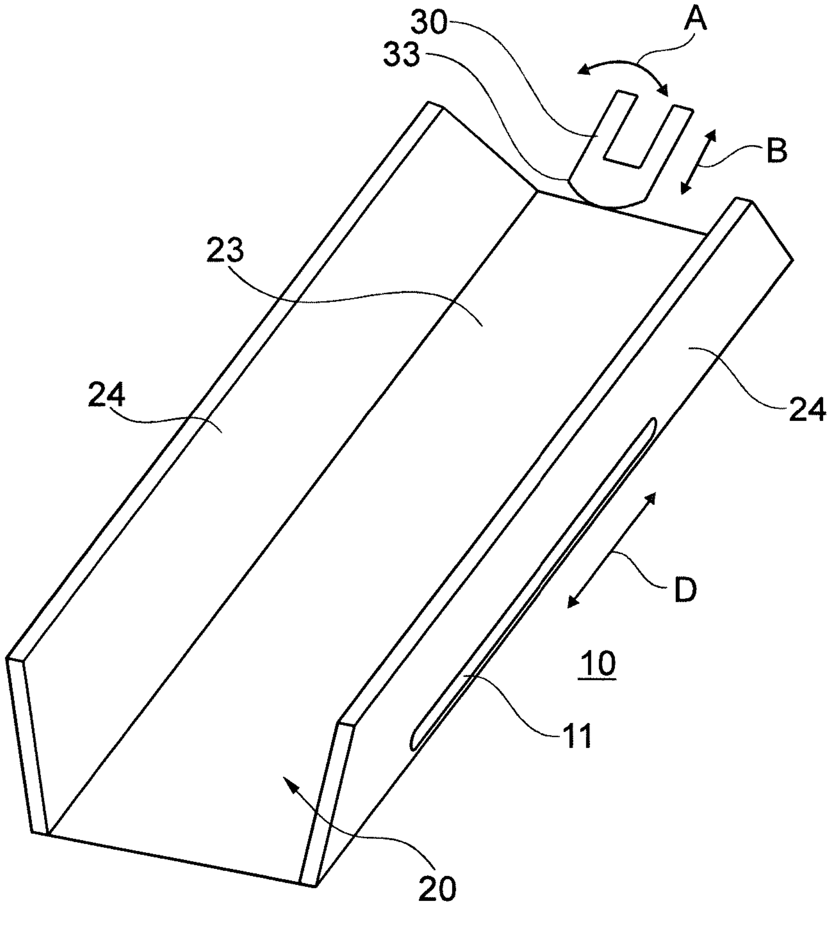

FIG. 3 shows a device 10 according to the invention with a linearly displaceable chute 20 with a receiving element 30 at the tip.

Preferably, the chute 20 is divided into at least two parts: an upper chute part 21 and a chute base 22. Particularly preferably, the upper chute part 21 is designed to be movable relative to the chute base 22. This can be done in the direction of the longitudinal axis of the chute 20 (direction of arrow E in FIG. 5), for example with an actuator (not shown). Alternatively or additionally, the upper chute part 21 can be pivoted relative to the chute base 22 (not shown), so that several parallel pick-up positions 420, 420' can be connected to one chute 20 as shown, for example, in FIG. 8.

The receiving element 30 preferably has an engagement section, preferably in the form of a projection element 31, which is designed, for example, like a fork/pitchfork. This can, for example, be insertable into at least one connecting element 210, for example at the bottom of the conveying bucket 200, in order to grip the conveying bucket 200 and move it in space by moving the receiving element 30, for example by rotating or tilting the receiving element 30 by means of an actuator 34.

Figure 8:
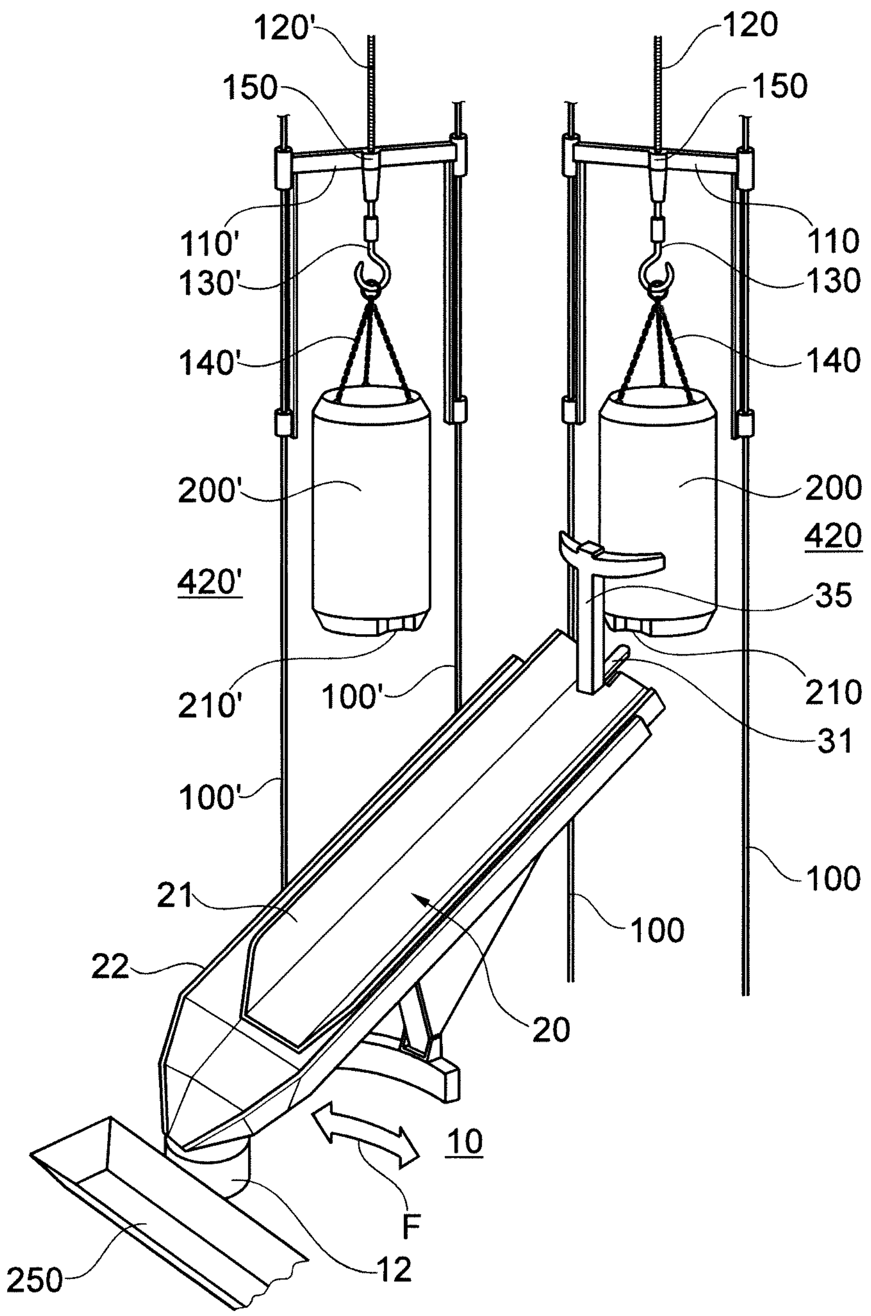

Furthermore, the receiving element 30 has a support element 35 arranged, for example, at right angles to the projection element 31 and, for example, at its rear end, against which a side wall 210 of the conveying bucket 200 comes to rest when the receiving element 30 has fully engaged in the connecting element 210. The support element 35 is preferably bent analogously to the bending of the side wall 220 of the conveying bucket 200, as shown in FIG. 8.

FIG. 3 shows a spatial view of a chute 20 in a retracted position, which corresponds to a bucket conveying position, before the conveying bucket 200 is moved to an emptying position 430. The chute 20 is in the conveying bucket transport position while the conveying bucket 200 is raised or lowered in the shaft until the bucket is in the pick-up position 420. By means of an actuator 11, for example a hydraulic cylinder, the chute 20 can be moved between a retracted conveying bucket transport position and an extended conveying bucket emptying position, here exemplified by arrow D.

The chute in FIG. 3 has a base 23 and side walls 24. If the chute 20 is telescopic, both the chute base 22 has a base 23' and side walls 24' and the upper chute part 21 has a base 23" and side walls 24".

Figure 4:
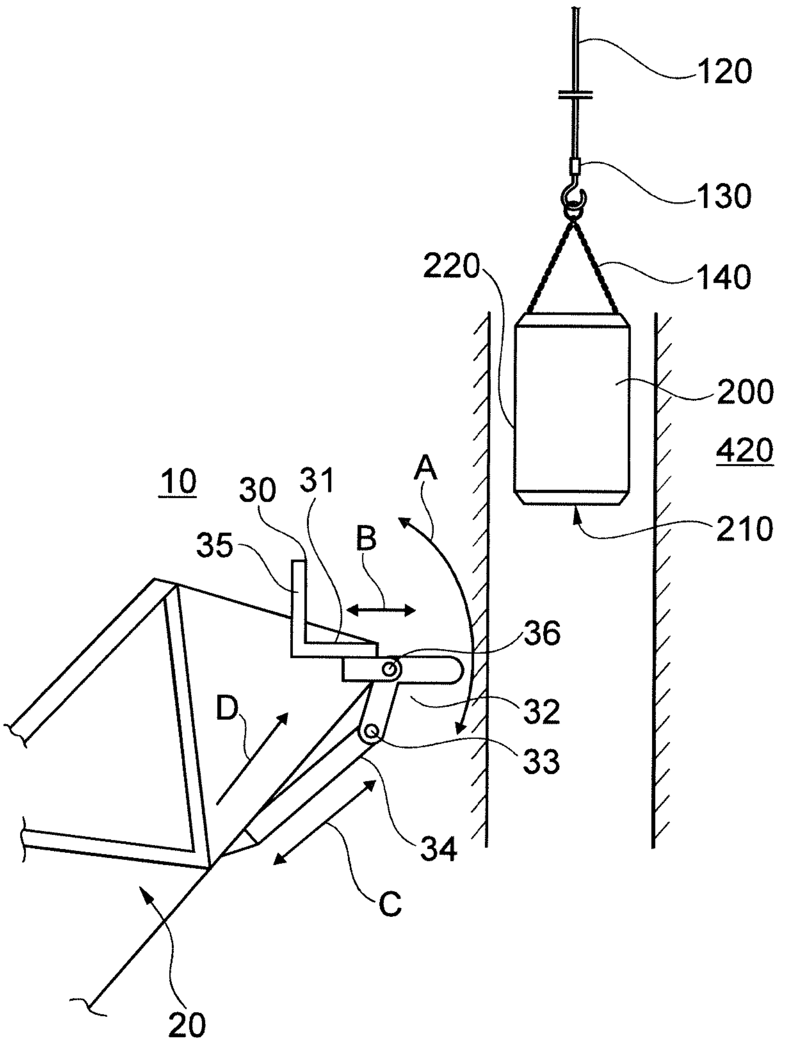

As shown in FIG. 4, the receiving element 30 is arranged, for example, on a sliding element 36 so as to be displaceable in the direction of arrow B on a rotation section 32.

The rotation section 32 can be rotated here, for example, about an axis of rotation 33 with an actuator 34, here for example a hydraulic cylinder, in the direction of arrow A. The rotation in the direction of arrow A is effected by extending and retracting the hydraulic cylinder 34 in the direction of arrow C. Other actuators can be used.

FIG. 4 shows a side view of the chute 20 according to the invention in a position analogous to FIG. 3.

If necessary, the conveying bucket 200 is rotated into a receiving position in the receiving position 420, so that a corresponding position of the conveying bucket 200 is given, so that the receiving element 30 can establish a retaining connection with the conveying bucket 200 via the at least one connecting element 210.

The at least one connecting element 210 at the lower end of the conveying bucket 200 points in the direction of the chute 20. The chute is then extended with the actuator 11 in the direction of arrow D until the projection element 31 (fork/pitchfork) is at the level of the at least one connecting element 210 of the conveying bucket 200.

Figure 5:
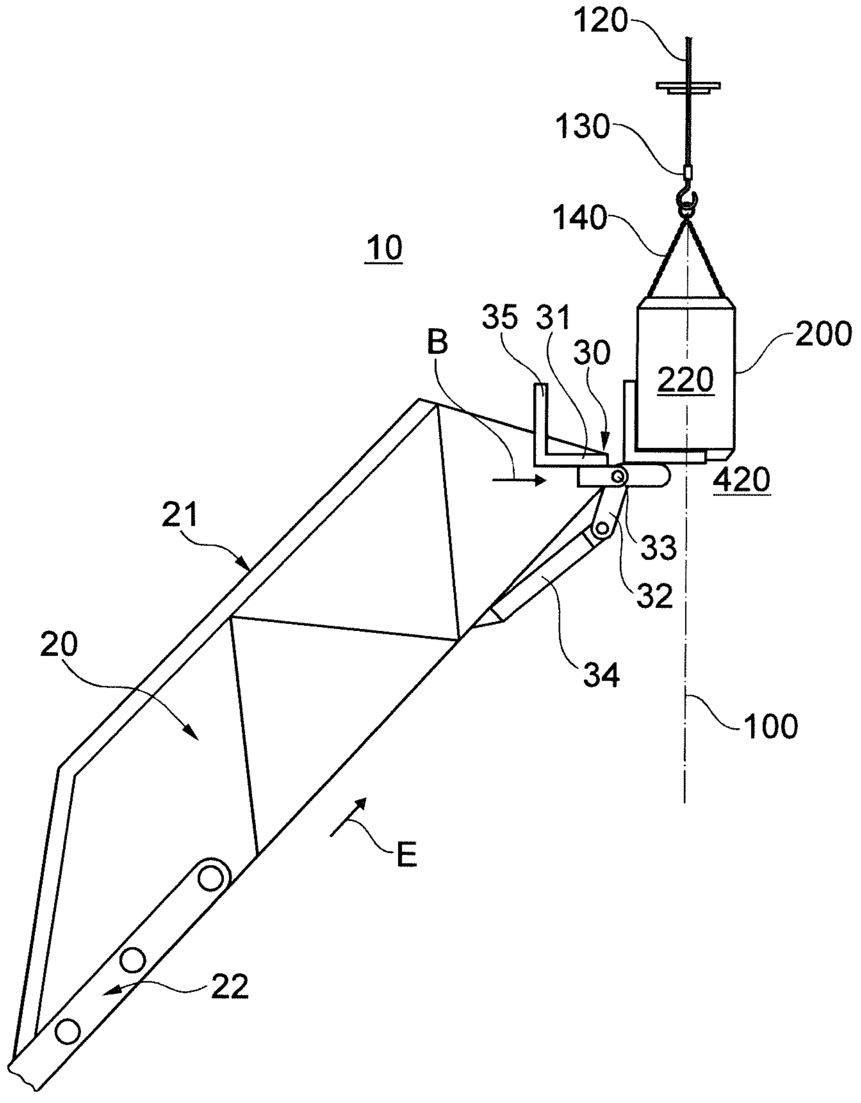
Figure 6:
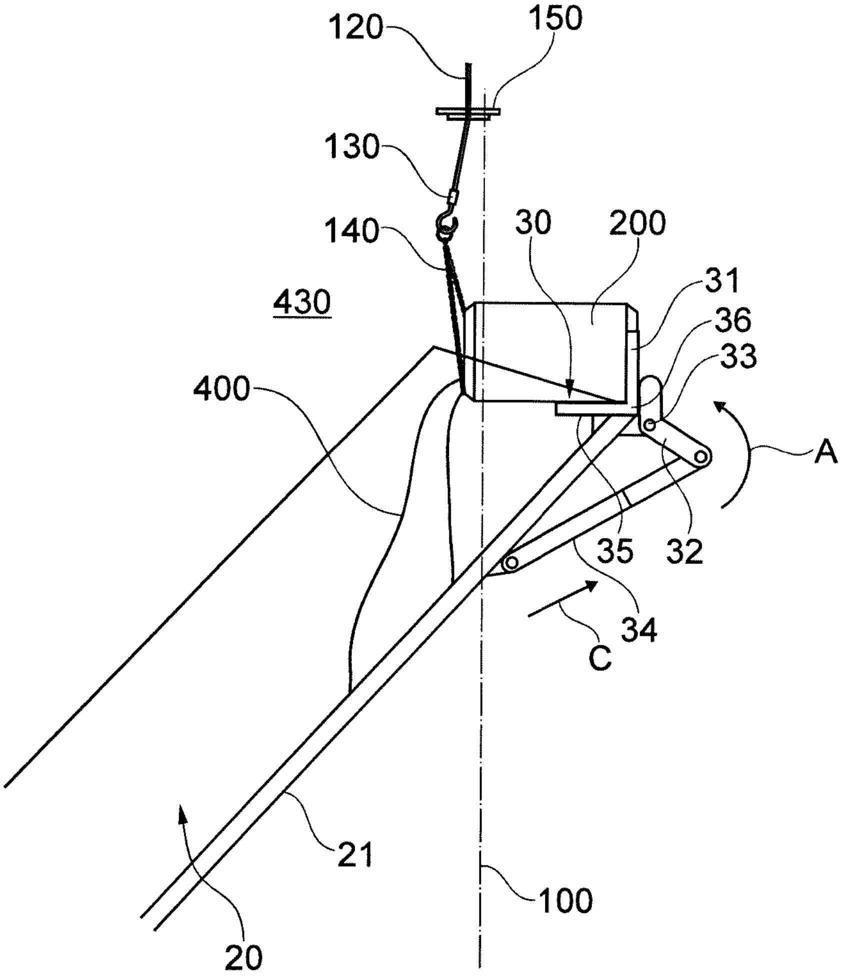
Figure 7:
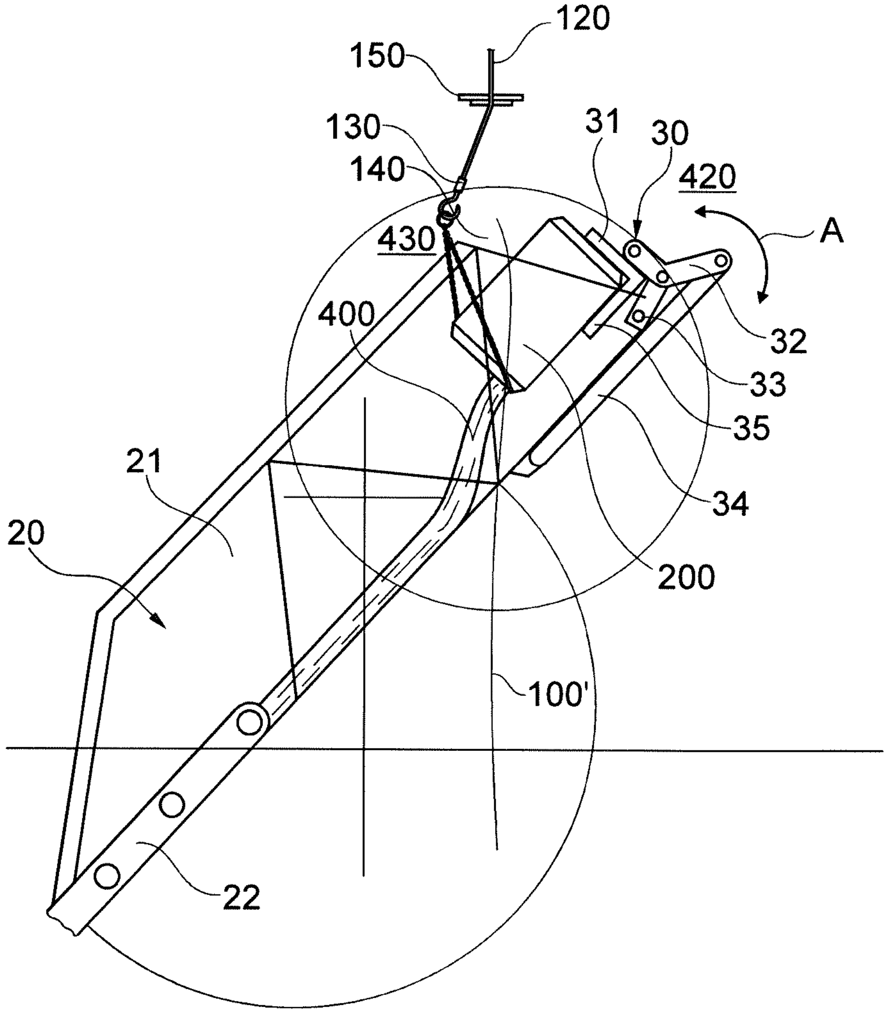

This can also be achieved by a telescopic chute 20, in which the chute 20 is divided into two parts, as shown for example in FIGS. 5 to 7. By means of an actuator not shown, preferably a hydraulic cylinder, the upper chute part 21 is moved relative to the chute base 22 in the direction of arrow E, preferably also until the projection element 31 is at the level of the connecting element 210.

The receiving element 30 with projection element 31 (fork/pitchfork) is then extended in the direction of arrow B, for example on the sliding element 36 (see also FIG. 5), and the at least one projection element 31 (fork/pitchfork) threads into the at least one connecting element 210 of the conveying bucket 200 in order to establish a connection with the conveying bucket 200. This preferably takes place until the support element 35 comes into contact with the side wall 220 of the conveying bucket 200.

The rotary section 32 is then rotated around the axis of rotation 33 in the direction of arrow A by means of the actuator 34. This is preferably done here by the hydraulic cylinder 34 extending in the direction of arrow C, whereby the receiving element 30 with the projection element 31 pivots about the axis of rotation 33, see FIG. 6 and FIG. 7. The conveying bucket 200 is advantageously held in relation to the chute 20, on the one hand by the engagement of the at least one projection element 31 in the at least one connecting element 210, and on the other hand by the support element 35, which is preferably shaped analogously to the bend of the side wall 220 of the conveying bucket 200.

Advantageously, the chute 20 is additionally extended further so that the chute 20 passes through the guide ropes 100 so that the hook 130 of the bucket 200 remains substantially in the plane of the guide ropes 100, as shown in FIGS. 6 and 7, so that the hauling rope 120 is not deflected unnecessarily, which would lead to the hauling rope 120 reeling up or down, which would correspondingly lead to a vertical movement of the bucket 200' located in the shaft, which would be disadvantageous.

Due to the high side walls 34, 34', 34" of the chute 20, or the upper chute part 21 and the chute base 22, nothing of the loosened soil/loosened rock/material 400 can fall down into the hoisting tower or shaft when the material 400 starts to move out of the conveying bucket into the chute 20.

For example, a conveyor chute 250, a belt or a conveyor carriage is connected to the chute 20.

In the maximum tilted position shown in FIG. 7, the conveying bucket 200 is emptied completely. If necessary, emptying can be assisted by shaking the bucket 200, for example via the actuator/hydraulic cylinder 34, by alternately moving it in and out, whereby complete emptying can be achieved.

After the conveying bucket 200 has been completely emptied, it is swung back in reverse order and the receiving element 30 is separated from the conveying bucket 200 by moving back horizontally. This releases the conveying bucket again in a controlled manner and it remains above the shaft axis in order to be lowered empty into the shaft again, while the other conveying bucket 200' is lifted filled into the receiving position 420'.

Here, the conveying bucket 200' is emptied using a second device 10' according to the invention.

Alternatively, only one device 10 according to the invention can be provided, as can be seen in FIG. 8. Here, a rotating device 12 is provided, which pivots the device 10 according to the invention from the first pick-up position 420 to the second pick-up position 420', or the chute 20 with the pick-up element 30 arranged thereon. The pivoting is performed by the rotating device in the direction of arrow F.

The chute 20 is preferably supported on a rail 13, which supports the stability of the device 10 during pivoting.

Alternatively, the rotation in the direction of arrow A can also only take place by moving the chute in the direction of arrow E, for example if the hook or the conveyor rope is fixed so that a rotational movement can take place.

Alternatively, the chute 20 and the receiving element 30 with its associated components 31 to 36 can be provided separately as two separate devices. For example, the receiving element 30 grips the conveying bucket 200 from a side that is different from the direction in which the chute 20 enters the area underneath the conveying bucket 200. For example, there may be an angle of 90° or even 180° between the directions of attack.

The invention claimed is:

1. An apparatus for emptying a conveying bucket of rock/soil/material loosened during the sinking of a shaft, comprising;

- a chute, configured to convey away the rock/soil/material emptied out of the conveying bucket, displaceable by a first actuator linearly between a conveying bucket transport position and a conveying bucket emptying position;
- a receiving element, comprising a projection element, for the conveying bucket, comprising a connection element, wherein the projection element is configured to extend into the conveying bucket connection element to produce a retained connection between the chute and conveying bucket, wherein the receiving element is on the chute and is rotatable by a second actuator between the chute and the receiving element about a rotation axis to rotate the retained bucket between a receiving position and an emptying position.

2. The apparatus as claimed in claim 1, wherein the projection element, includes at least one of a fork-like element or fork element.

3. The apparatus as claimed in claim 2, wherein the rotation portion is pivotable by the second actuator, including a hydraulic cylinder.

4. The apparatus as claimed in claim 1, wherein the chute comprises at least two pieces, wherein one piece is displaceable relative to the other piece.

5. The apparatus as claimed in claim 4, wherein the displacement is produced by a third actuator, including a hydraulic cylinder.

6. The apparatus as claimed of 1, wherein the conveying bucket is rotatable by more than 90 degrees.

7. The apparatus as claimed in claim 1, wherein the conveying bucket is rotatable to be parallel with a base of the chute.

8. The apparatus as claimed in 1, comprising a rotation apparatus configured to rotate at least one of the chute or the receiving element horizontally between at least one of two receiving positions or emptying positions.

* * * * *